United States Patent
Jeong et al.

(10) Patent No.: US 9,052,553 B2
(45) Date of Patent: Jun. 9, 2015

(54) LIQUID CRYSTAL DISPLAY

(71) Applicant: Samsung Display Co., Ltd., Yongin, Gyeonggi-Do (KR)

(72) Inventors: Youn Hak Jeong, Cheonan-si (KR); Seung-Hwan Kim, Asan-si (KR); Kwi Hyun Kim, Suwon-si (KR); Jang Soo Kim, Yongin-si (KR); Sang Yong No, Asan-si (KR); Jae-Jin Song, Hwaseong-si (KR); Byoung Sun Na, Hwaseong-si (KR); Seung Soo Baek, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 294 days.

(21) Appl. No.: 13/837,861

(22) Filed: Mar. 15, 2013

(65) Prior Publication Data

US 2013/0342777 A1    Dec. 26, 2013

(30) Foreign Application Priority Data

Jun. 22, 2012  (KR) ......................... 10-2012-0067433

(51) Int. Cl.
G09G 3/36       (2006.01)
G02F 1/1343     (2006.01)
G02F 1/1362     (2006.01)

(52) U.S. Cl.
CPC ...... *G02F 1/134336* (2013.01); *G02F 1/13624* (2013.01); *G02F 1/136286* (2013.01); *G02F 2001/134345* (2013.01); *G09G 3/3648* (2013.01); *G09G 2300/0426* (2013.01); *G09G 2300/043* (2013.01); *G09G 2300/0447* (2013.01)

(58) Field of Classification Search
CPC .......... G09G 3/3648; G09G 2300/043; G09G 2300/0426; G09G 2300/0447; G02F 1/13624; G02F 1/136286; G02F 2001/134345; G02F 1/134336

See application file for complete search history.

(56) References Cited

U.S. PATENT DOCUMENTS

| | | |
|---|---|---|
| 7,843,520 B2 | 11/2010 | Lu et al. |
| 7,916,108 B2 | 3/2011 | Yang et al. |
| 2008/0186304 A1 | 8/2008 | You et al. |
| 2009/0135322 A1 | 5/2009 | Kim et al. |
| 2009/0295703 A1 | 12/2009 | Hsieh et al. |
| 2010/0001940 A1 | 1/2010 | Lee et al. |
| 2010/0157185 A1 | 6/2010 | Kim et al. |
| 2010/0182298 A1 | 7/2010 | Song |

(Continued)

FOREIGN PATENT DOCUMENTS

| | | |
|---|---|---|
| KR | 1020070069801 A | 7/2007 |
| KR | 1020080062542 A | 7/2008 |
| KR | 1020090054300 A | 5/2009 |
| KR | 1020100047061 A | 5/2010 |
| KR | 100997974 B1 | 11/2010 |

*Primary Examiner* — Adam R Giesy

(74) *Attorney, Agent, or Firm* — Cantor Colburn LLP

(57) ABSTRACT

A liquid crystal display includes a first substrate, a first gate line disposed on the first substrate, a second gate line disposed on the first substrate, a data line disposed on the first substrate, a reference voltage line disposed on the first substrate and extending substantially to be parallel to the data line, a first subpixel electrode disposed in a pixel area on the first substrate, a second subpixel electrode disposed in the pixel area on the first substrate, a first switching element connected to the first gate line, the data line and the first subpixel electrode, a second switching element connected to the first gate line, the data line and the second subpixel electrode, and a third switching element connected to the first subpixel electrode and the reference voltage line.

26 Claims, 13 Drawing Sheets

(56) References Cited

U.S. PATENT DOCUMENTS

| | | |
|---|---|---|
| 2010/0225627 A1 | 9/2010 | Goh et al. |
| 2011/0115998 A1 | 5/2011 | Liao et al. |
| 2011/0205461 A1 | 8/2011 | Chen et al. |
| 2011/0261028 A1 | 10/2011 | Goh et al. |
| 2012/0105785 A1* | 5/2012 | Kim et al. .............. 349/139 |

* cited by examiner

LIQUID CRYSTAL DISPLAY

This application claims priority to Korean Patent Application No. 10-2012-0067433 filed on Jun. 22, 2012, and all the benefits accruing therefrom under 35 U.S.C. §119, the content of which in its entirety is herein incorporated by reference.

BACKGROUND (a) Field

Exemplary embodiments of the invention relate to a liquid crystal display.

(b) Description of the Related Art

A liquid crystal display, which is one of the most widely used types of flat panel displays, typically includes two panels with field generating electrodes such as a pixel electrode and a common electrode, for example, and a liquid crystal layer interposed between the two panels. The liquid crystal display generates an electric field in the liquid crystal layer by applying voltage to the field generating electrodes, and the direction of liquid crystal molecules of the liquid crystal layer is determined by the generated electric field, thus controlling polarization of incident light to display images.

In the liquid crystal display, when the electric field is not generated in the liquid crystal layer, since a vertically aligned mode liquid crystal display, in which longitudinal axes of liquid crystal molecules are arranged substantially vertical to the display panel, has a large contrast ratio and a wide reference viewing angle, the vertically aligned mode liquid crystal display has been in the limelight. Here, the reference viewing angle means a luminance inversion critical angle between viewing angles or grays which have the contrast ratio of 1:10.

In the vertically aligned mode liquid crystal display, to improve side visibility to be close to front visibility, a method is proposed, in which one pixel is divided into two subpixels and voltage of any one subpixel thereof is lowered and as a result, voltages of the two subpixels are different from each other, such that transmittances thereof are different from each other.

However, as described above, in the vertically aligned mode liquid crystal display where one pixel is divided into two subpixels and voltage of any one subpixel thereof is lowered and as a result, voltages of the two subpixels are different from each other, luminance of the side is increased as compared with the front in a low gray and thus a gray in a low gray region may not be accurately expressed, and the entire luminance is lowered as compared with the applied pixel voltage and as a result, driving efficiency may be impaired.

SUMMARY

Exemplary embodiments of the invention relate to a liquid crystal display, in which grayscale levels in a low gray region is effectively expressed with improved side visibility, which is substantially close to front visibility, and luminance corresponding to a driving voltage is effectively prevented from being decreased.

An exemplary embodiment of the invention provides a liquid crystal display including: a first substrate; a first gate line disposed on the first substrate; a second gate line disposed on the first substrate; a data line disposed on the first substrate; a reference voltage line disposed on the first substrate and extending substantially to be parallel to the data line; a first subpixel electrode disposed in a pixel area on the first substrate; a second subpixel electrode disposed in the pixel area on the first substrate; a first switching element connected to the first gate line, the data line and the first subpixel electrode; a second switching element connected to the first gate line, the data line and the second subpixel electrode; and a third switching element connected to the first subpixel electrode.

In an exemplary embodiment, the third switching element may be connected to the first gate line and the reference voltage line.

In an exemplary embodiment, a data voltage applied to the data line and a reference voltage applied to the reference voltage line may have a same polarity as a common voltage applied to a common electrode.

In an exemplary embodiment, the reference voltage may have a predetermined magnitude, and a polarity of the reference voltage may be changed in each frame.

In an exemplary embodiment, a difference in voltage between the first subpixel electrode and the common electrode may be greater than a difference in voltage between the second subpixel electrode and the common electrode.

In an exemplary embodiment, an input terminal of the third switching element may be connected to the reference voltage line, and an output terminal of the third switching element may be connected to the first subpixel electrode.

In an exemplary embodiment, the reference voltage line may include a first reference voltage line and a second reference voltage line, to which reference voltages having different polarities are applied, and each of the first reference voltage line and the second reference voltage line may overlap the first subpixel electrode and the second subpixel electrode.

In an exemplary embodiment, the third switching element may be connected to the second gate line.

In an exemplary embodiment, the liquid crystal display may further include a boosting capacitor connected to the third switching element, in which the reference voltage line may be connected to a first terminal of the boosting capacitor.

According to the exemplary embodiment of the invention, the pixel electrode is divided into the first subpixel electrode and the second subpixel electrode, substantially the same data voltage is applied to the first subpixel electrode and the second subpixel electrode, and the thin film transistor connected to the first subpixel electrode and the reference voltage line is included, such that the voltage of the first subpixel electrode is effectively controlled to be higher than the data voltage. Therefore, a grayscale level in a low gray region may be changed substantially smoothly, and as a result, the grayscale level in the low gray region is substantially effectively expressed, high luminance is thereby obtained, and side visibility is substantially close to the front visibility, thereby substantially improving the visibility.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
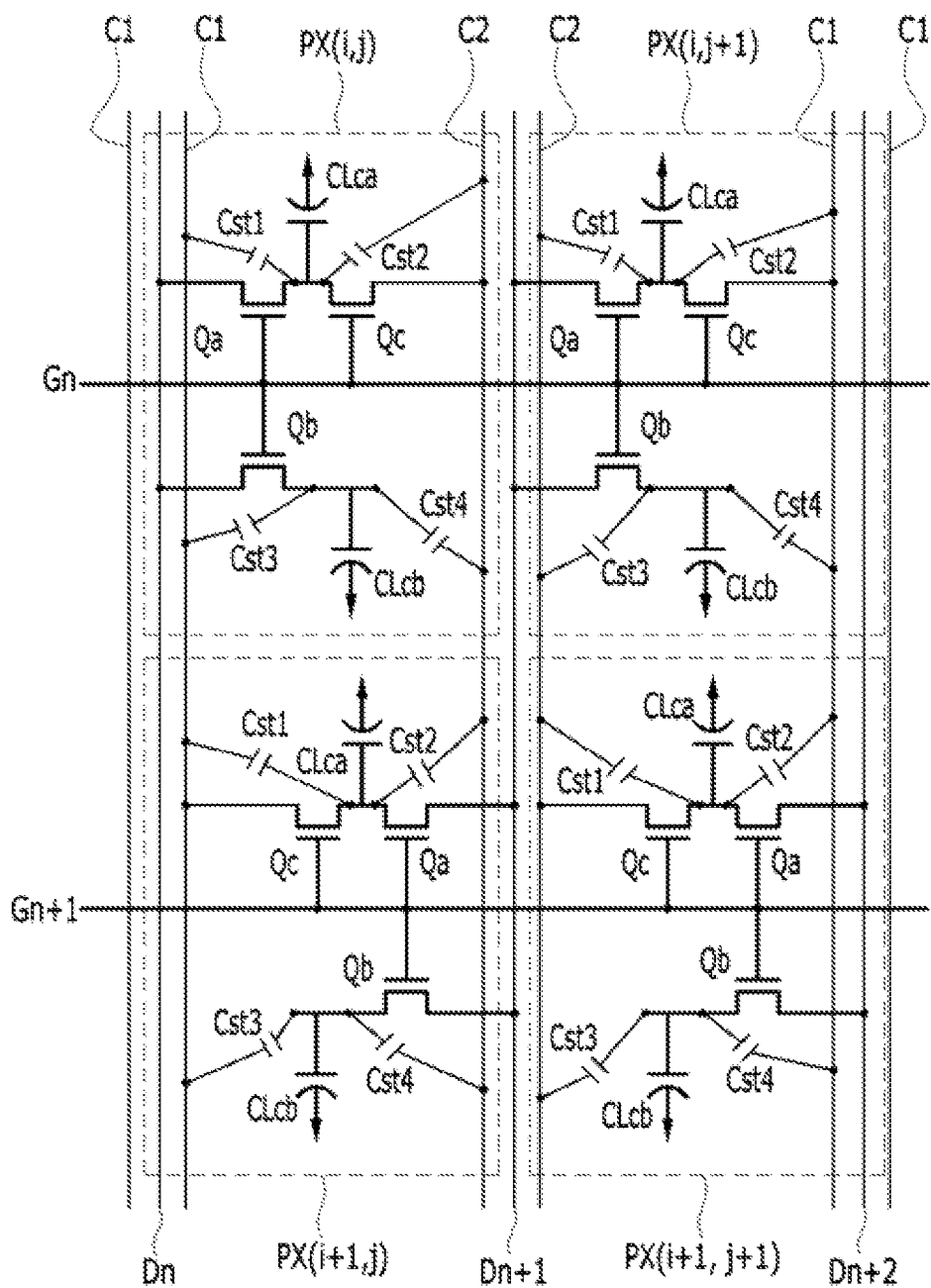
FIG. 1 is an equivalent circuit diagram of four pixels of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Layouts of signal lines and pixels of an exemplary embodiment of a liquid crystal display according to the invention and an exemplary embodiment of a driving method thereof will be described with reference to FIG. 1.

FIG. 1 is an equivalent circuit diagram of four pixels of an exemplary embodiment of a liquid crystal display according to the invention.

Referring to FIG. 1, an exemplary embodiment of a liquid crystal display includes a first pixel PX(i, j) and a second pixel PX(i, j+1), which are adjacent to each other in a pixel row direction, a third pixel PX(i+1, j) and a fourth pixel PX(i+1, j+1), which are adjacent to the first pixel PX(i, j) and the second pixel PX(i, j+1) in a pixel column direction, and a plurality of signal lines Gn, Gn+1, Dn, Dn+1, Dn+2, C1 and C2 which are connected thereto.

The signal lines Gn, Gn+1, Dn, Dn+1, Dn+2, C1 and C2 include a plurality of gate lines, e.g., a first gate line Gn and a second gate line Gn+1, which transfer gate signals (referred to as "scanning signals), a plurality of data lines, e.g., a first data line Dn, a second data line Dn+1 and a third data line Dn+2, which transfer data voltages, and a plurality of reference voltage lines C1 and C2 which transfer predetermined reference voltages. The reference voltage lines C1 and C2 include a first reference voltage line C1 and a second reference voltage line C2 which transfer reference voltages having different polarities.

A first reference voltage and second reference voltage, which have a predetermined magnitude, are applied to the first reference voltage line C1 and the second reference voltage line C2, respectively, and polarities of the first reference voltage and the second reference voltage are changed every frame. In one exemplary embodiment, for example, when the magnitude of a common voltage applied to a common electrode, is about 7.5 volts (V), the first reference voltage may have a value of about 15 V or about zero (0) V in each frame, and the second reference voltage may have a value of about zero (0) V or about 15 V in each frame. The first reference voltage and the second reference voltage may be greater or less than a maximum value of the data voltage. In such an embodiment, when the first reference voltage and the second reference voltage have positive polarities with reference to the common voltage, a difference between the first reference voltage and the second reference voltage and the common voltage may be different from a difference between the first reference voltage and the second reference voltage and the common voltage when the first reference voltage and the second reference voltage have negative polarities with reference to the common voltage.

The first pixel PX(i, j) includes a first switching element Qa, a second switching element Qb, a third switching element Qc, a first liquid crystal capacitor Clca and a second liquid crystal capacitor Clcb, and a first storage capacitor Cst1, a second storage capacitor Cst2, a third storage capacitor Cst3 and a fourth storage capacitor Cst4, and the first gate line Gn, the first data line Dn, the first reference voltage line C1 and the second reference voltage line C2, are connected thereto.

Each of the first switching element Qa and the second switching element Qb of the first pixel PX(i,j) is connected to the first gate line Gn and the first data line Dn, and the third switching element Qc i of the first pixel PX(i, j) is connected to the first gate line Gn, the first reference voltage line C1 and an output terminal of the first switching element Qa of the first pixel PX(i, j).

In an exemplary embodiment, the first switching element Qa and the second switching element Qb of the first pixel PX(i, j) are three-terminal elements such as a thin film transistor, of which a control terminal is connected to the first gate line Gn, and an input terminal is connected to the first data line Dn. In such an embodiment, the output terminal of the first switching element Qa of the first pixel PX(i, j) is connected to the first liquid crystal capacitor Clca of the first pixel PX(i, j) and an output terminal of the third switching element Qc of the first pixel PX(i, j), and the output terminal of the second switching element Qb of the first pixel PX(i,j) is connected to the second liquid crystal capacitor Clcb of the first pixel PX(i, j).

The third switching element Qc of the first pixel PX(i, j) is a three-terminal element such as a thin film transistor, of which a control terminal is connected to the first gate line Gn, an input terminal is connected to the second reference voltage line C2, and an output terminal is connected with the second liquid crystal capacitor Clcb of the first pixel PX(i, j).

The first storage capacitor Cst1 of the first pixel PX(i, j) is connected to the output terminal of the first switching element Qa of the first pixel PX(i, j) and the first reference voltage line C1, the second storage capacitor Cst2 of the first pixel PX(i, j) is connected to the output terminal of the first switching element Qa of the first pixel PX(i, j) and the second reference voltage line C2, the third storage capacitor Cst3 of the first pixel PX(i, j) is connected to the output terminal of the second switching element Qb of the first pixel PX(i, j) and the first reference voltage line C1, and the fourth storage capacitor Cst4 of the first pixel PX(i, j) is connected to the output terminal of the second switching element Qb of the first pixel PX(i, j) and the second reference voltage line C2.

The second pixel PX(i, j+1) includes a first switching element Qa, a second switching element Qb, a third switching element Qc, a first liquid crystal capacitor Clca and a second liquid crystal capacitor Clcb, and a first storage capacitor Cst1, a second storage capacitor Cst2, a third storage capacitor Cst3 and a fourth storage capacitor Cst4, and the first gate line Gn, a second data line Dn+1, the first reference voltage line C1 and the second reference voltage line C2 are connected thereto.

Control terminals of the first switching element Qa and the second switching element Qb of the second pixel PX(i, j+1) are connected to the first gate line Gn, and input terminals of the first switching element Qa and the second switching element Qb of the second pixel PX(i, j+1) are connected to the second data line Dn+1, respectively.

An output terminal of the first switching element Qa of the second pixel PX(i, j+1) is connected to the first liquid crystal capacitor Clca and the output terminal of the third switching element Qc of the second pixel PX(i, j+1), and an output terminal of the second switching element Qb of the second pixel PX(i, j+1) is connected to the second liquid crystal capacitor Clcb.

A control terminal of the third switching element Qc of the second pixel PX(i, j+1) is connected to the first gate line Gn, an input terminal of the third switching element Qc of the second pixel PX(i, j+1) is connected to the first reference voltage line C1, and an output terminal of the third switching element Qc of the second pixel PX(i, j+1) is connected with the second liquid crystal capacitor Clcb.

The first storage capacitor Cst1 of the second pixel PX(i, j+1) is connected to the output terminal of the first switching element Qa of the second pixel PX(i, j+1) and the second reference voltage line C2, the second storage capacitor Cst2 of the second pixel PX(i, j+1) is connected to the output terminal of the first switching element Qa and the first reference voltage line C1, the third storage capacitor Cst3 of the second pixel PX(i, j+1) is connected to the output terminal of the second switching element Qb and the second reference voltage line C2, and the fourth storage capacitor Cst4 of the second pixel PX(i, j+1) is connected to the output terminal of the second switching element Qb and the first reference voltage line C1.

The third pixel PX(i+1, j) includes a first switching element Qa, a second switching element Qb, a third switching element Qc, a first liquid crystal capacitor Clca and a second liquid crystal capacitor Clcb, and a first storage capacitor Cst1, a second storage capacitor Cst2, a third storage capacitor Cst3 and a fourth storage capacitor Cst4, and the second gate line Gn+1, the second data line Dn+1, the first reference voltage line C1 and the second reference voltage line C2 are connected thereto.

Control terminals of the first switching element Qa and the second switching element Qb of the third pixel PX(i+1, j) are connected to the second gate line Gn+1, and input terminals of the first switching element Qa and the second switching element Qb of the third pixel PX(i+1, j) are connected to the second data line Dn+1.

An output terminal of the first switching element Qa of the third pixel PX(i+1, j) is connected to the first liquid crystal capacitor Clca of the third pixel PX(i+1, j) and an output terminal of the third switching element Qc of the third pixel PX(i+1, j), and an output terminal of the second switching element Qb of the third pixel PX(i+1, j) is connected to the second liquid crystal capacitor Clcb of the third pixel PX(i+1, j).

A control terminal of the third switching element Qc of the third pixel PX(i+1, j) is connected to the second gate line Gn+1, an input terminal of the third switching element Qc of the third pixel PX(i+1, j) is connected to the first reference voltage line C1, and an output terminal of the third switching element Qc of the third pixel PX(i+1, j) is connected with the second liquid crystal capacitor Clcb of the third pixel PX(i+1, j).

The first storage capacitor Cst1 of the third pixel PX(i+1, j) is connected to the output terminal of the first switching element Qa of the third switching element Qc of the third pixel PX(i+1, j) and the first reference voltage line C1, the second storage capacitor Cst2 of the third switching element Qc of the third pixel PX(i+1, j) is connected to the output terminal of the first switching element Qa of the third switching element Qc of the third pixel PX(i+1, j) and the second reference voltage line C2, the third storage capacitor Cst3 of the third switching element Qc of the third pixel PX(i+1, j) is connected to the output terminal of the second switching element Qb of the third switching element Qc of the third pixel PX(i+1, j) and the first reference voltage line C1, and the fourth storage capacitor Cst4 of the third switching element Qc of the third pixel PX(i+1, j) is connected to the output terminal of the second switching element Qb of the third switching element Qc of the third pixel PX(i+1, j) and the second reference voltage line C2.

The fourth pixel PX(i+1, j+1) includes a first switching element Qa, a second switching element Qc, a third switching element Qc, a first liquid crystal capacitor Clca and a second liquid crystal capacitor Clcb, and a first storage capacitor Cst1, a second storage capacitor Cst2, a third storage capacitor Cst3 and a fourth storage capacitor Cst4, and the second gate line Gn+1, the third data line Dn+2, the first reference voltage line C1 and the second reference voltage line C2 are connected thereto.

Control terminals of the first switching element Qa and the second switching element Qb of the fourth pixel PX(i+1, j+1) are connected to the second gate line Gn+1, and input terminals of the first switching element Qa and the second switching element Qb of the fourth pixel PX(i+1, j+1) are connected to the third data line Dn+2.

An output terminal of the first switching element Qa of the fourth pixel PX(i+1, j+1) is connected to the first liquid crystal capacitor Clca of the fourth pixel PX(i+1, j+1) and an output terminal of the third switching element Qc of the fourth pixel PX(i+1, j+1), and an output terminal of the second switching element Qb of the fourth pixel PX(i+1, j+1) is connected to the second liquid crystal capacitor Clcb of the fourth pixel PX(i+1, j+1).

A control terminal of the third switching element Qc of the fourth pixel PX(i+1, j+1) is connected to the second gate line Gn+1, an input terminal of the third switching element Qc of the fourth pixel PX(i+1, j+1) is connected to the second reference voltage line C2, and an output terminal of the third switching element Qc of the fourth pixel PX(i+1, j+1) is connected with the second liquid crystal capacitor Clcb of the fourth pixel PX(i+1, j+1).

The first storage capacitor Cst1 of the fourth pixel PX(i+1, j+1) is connected to the output terminal of the first switching element Qa of the fourth pixel PX(i+1, j+1) and the second reference voltage line C2, the second storage capacitor Cst2 of the fourth pixel PX(i+1, j+1) is connected to the output terminal of the first switching element Qa of the fourth pixel PX(i+1, j+1) and the first reference voltage line C1, the third storage capacitor Cst3 of the fourth pixel PX(i+1, j+1) is connected to the output terminal of the second switching element Qb of the fourth pixel PX(i+1, j+1) and the second reference voltage line C2, and the fourth storage capacitor Cst4 of the fourth pixel PX(i+1, j+1) is connected to the output terminal of the second switching element Qb of the fourth pixel PX(i+1, j+1) and the first reference voltage line C1.

In such an embodiment, when a gate-on signal is applied to the first gate line Gn, the first switching elements Qa, the second switching elements Qb and the third switching elements Qc of the first pixel PX(i, j) and the second pixel PX(i, j+1), which are connected to the first gate line Gn, are turned on. Accordingly, the data voltage applied to the first data line Dn is applied to one terminal of the first liquid crystal capacitor Clca and the second liquid crystal capacitor Clcb of the first pixel PX(i, j) through the turned-on first switching element Qa and second switching element Qb of the first pixel PX(i, j), and the data voltage applied to the second data line Dn+1 is applied to one terminal of the first liquid crystal capacitor Clca and the second liquid crystal capacitor Clcb of the second pixel PX(i, j+1) through the turned-on first switching element Qa and second switching element Qb of the second pixel PX(i, j+1). In such an embodiment, the first liquid crystal capacitor Clca and the second liquid crystal capacitor Clcb of the first pixel PX(i, j) are charged to substantially the same voltage, and the first liquid crystal capacitor Clca and the second liquid crystal capacitor Clcb of the second pixel PX(i, j+1) are charged to substantially the same voltage. In an exemplary embodiment, one terminal of the first liquid crystal capacitor Clca of the first pixel PX(i, j) is connected to the output terminal of the third switching element Qc to be boosted by reference voltage, which is applied to the second reference voltage line C2, through the third switching element Qc. In such an embodiment, the second reference voltage applied to the second reference voltage line C2 has the same polarity as the data voltage applied to the first data line Dn, and a magnitude thereof may be greater than a magnitude of data voltage applied to the first data line Dn. Accordingly, in such an embodiment, voltage of the second reference voltage line C2, to which relatively high voltage is applied through the third switching element Qc, is divided and thus the voltage which is charged to the first liquid crystal capacitor Clca has a higher value than the data voltage applied through the first data line Dn.

In an exemplary embodiment, one terminal of the first liquid crystal capacitor Clca of the second pixel PX(i, j+1) is connected to the output terminal of the third switching element Qc to be boosted by reference voltage, which is applied to the first reference voltage line C1 through the third switching element Qc. In such an embodiment, the first reference voltage applied to the first reference voltage line C1 has the same polarity as the data voltage applied to the second data line Dn+1 and may have a higher value than the data voltage applied to the second data line Dn+1. Accordingly, voltage of the first reference voltage line C1, to which relatively high voltage is applied through the third switching element Qc, is divided, and thus the voltage, which is charged to the first liquid crystal capacitor Clca, has a higher value than the data voltage.

When the gate voltage of the first gate line Gn is changed into gate-off voltage, and the gate voltage of the second gate line Gn+1 is changed into the gate-on voltage, the first switching elements Qa, the second switching elements Qb and the third switching elements Qc of the third pixel PX(i+1, j) and the fourth pixel PX(i+1, j+1), which are connected to the second gate line Gn+1, are turned on. Accordingly, the data voltage applied to the second data line Dn+1 is applied to one terminal of each of the first liquid crystal capacitor Clca and the second liquid crystal capacitor Clcb of the third pixel PX(i+1, j) through the turned-on first switching element Qa and second switching element Qb of the third pixel PX(i+1, j), and the data voltage applied to the third data line Dn+2 is applied to one terminal of each of the first liquid crystal capacitor Clca and the second liquid crystal capacitor Clcb of the fourth pixel PX(i+1, j+1) through the turned-on first switching element Qa and second switching element Qb of the fourth pixel PX(i+1, j+1). In such an embodiment, the first liquid crystal capacitor Clca and the second liquid crystal capacitor Clcb of the third pixel PX(i+1, j) are charged to substantially the same voltage, and the first liquid crystal capacitor Clca and the second liquid crystal capacitor Clcb of the fourth pixel PX(i+1, j+1) are charged to substantially the same voltage. In such an embodiment, one terminal of the first liquid crystal capacitor Clca of the third pixel PX(i+1, j) is connected to the output terminal of the third switching element Qc to be boosted by reference voltage, which is applied to the first reference voltage line C1 through the third switching element Qc. In such an embodiment, the first reference voltage applied to the first reference voltage line C1 has the same polarity as the data voltage applied to the second data line Dn+1 and may have a higher value than the data voltage applied to the second data line Dn+1. Accordingly, voltage of the first reference voltage line C1, to which relatively high voltage is applied through the third switching element Qc, is divided and thus a magnitude of the voltage which is charged to the first liquid crystal capacitor Clca has a higher value than the data voltage which is applied through the second data line Dn+1.

In an exemplary embodiment, one terminal of the first liquid crystal capacitor Clca of the fourth pixel PX(i+1, j+1) is connected to the output terminal of the third switching element Qc to be boosted by reference voltage which is applied to the second reference voltage line C2 through the third switching element Qc. In such an embodiment, the second reference voltage applied to the second reference voltage line C2 has the same polarity as the data voltage applied to the third data line Dn+2 and may have a higher value than the data voltage applied to the third data line Dn+2. Accordingly, voltage of the second reference voltage line C2, to which relatively high voltage is applied through the third switching element Qc, is divided and thus a magnitude of the voltage which is charged to the first liquid crystal capacitor Clca is greater than that of the data voltage.

The voltage charged in the first liquid crystal capacitor Clca and the voltage charged in the second liquid crystal capacitor Clcb are different from each other. Since the voltage charged in the first liquid crystal capacitor Clca and the voltage charged in the second liquid crystal capacitor Clcb are different from each other, inclined angles of liquid crystal molecules in the first subpixel and the second subpixel are different from each other, and thus luminances of the two subpixels are different from each other. Accordingly, an image viewed from the side may be substantially similar to an image viewed from the front by controlling the voltage charged in the first liquid crystal capacitor Clca and the voltage charged in the second liquid crystal capacitor Clcb, thereby substantially improving side visibility.

Figure 2:
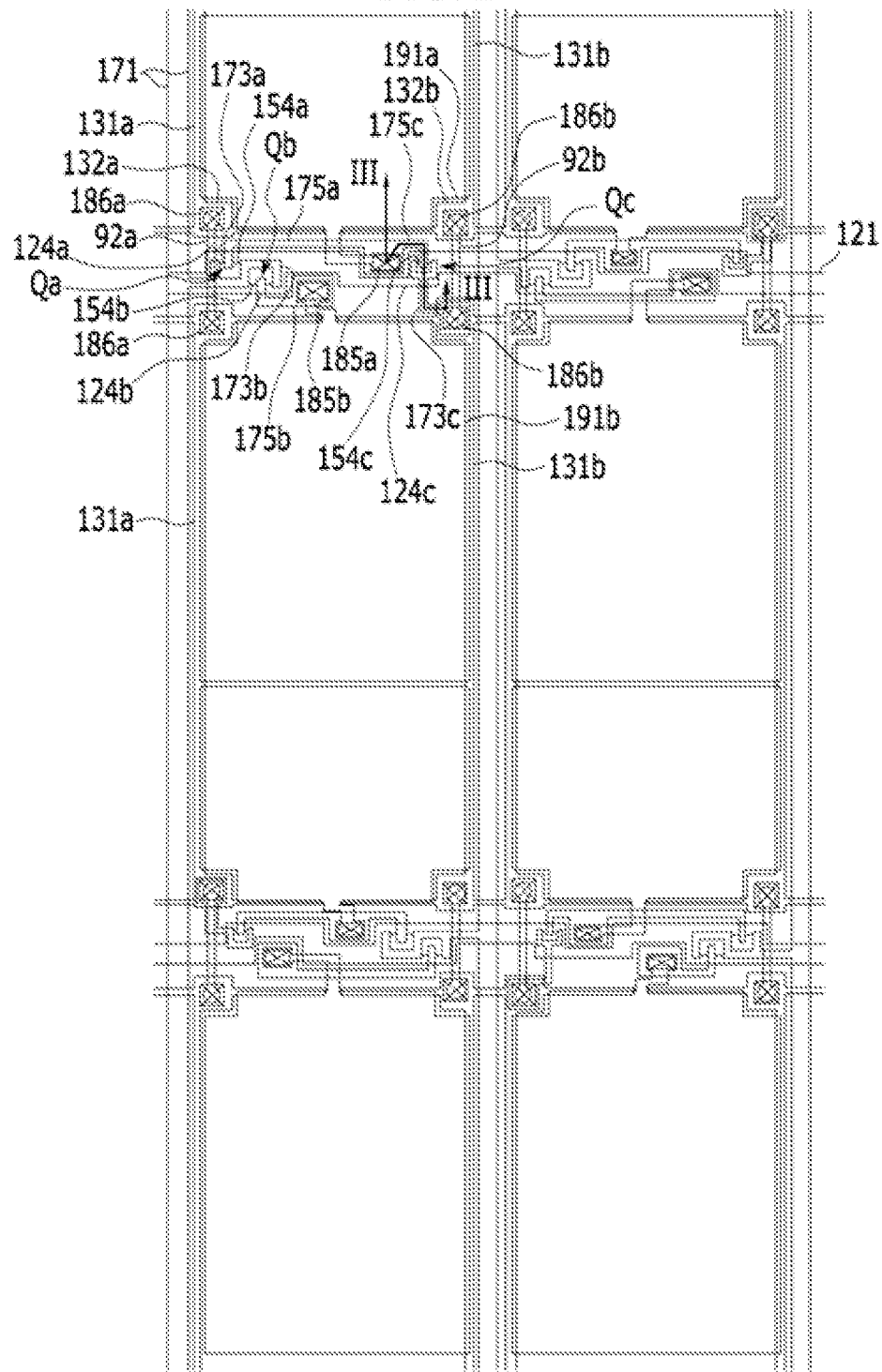
FIG. 2 is a top plan view of an exemplary embodiment of the liquid crystal display according to the invention.
Figure 3:
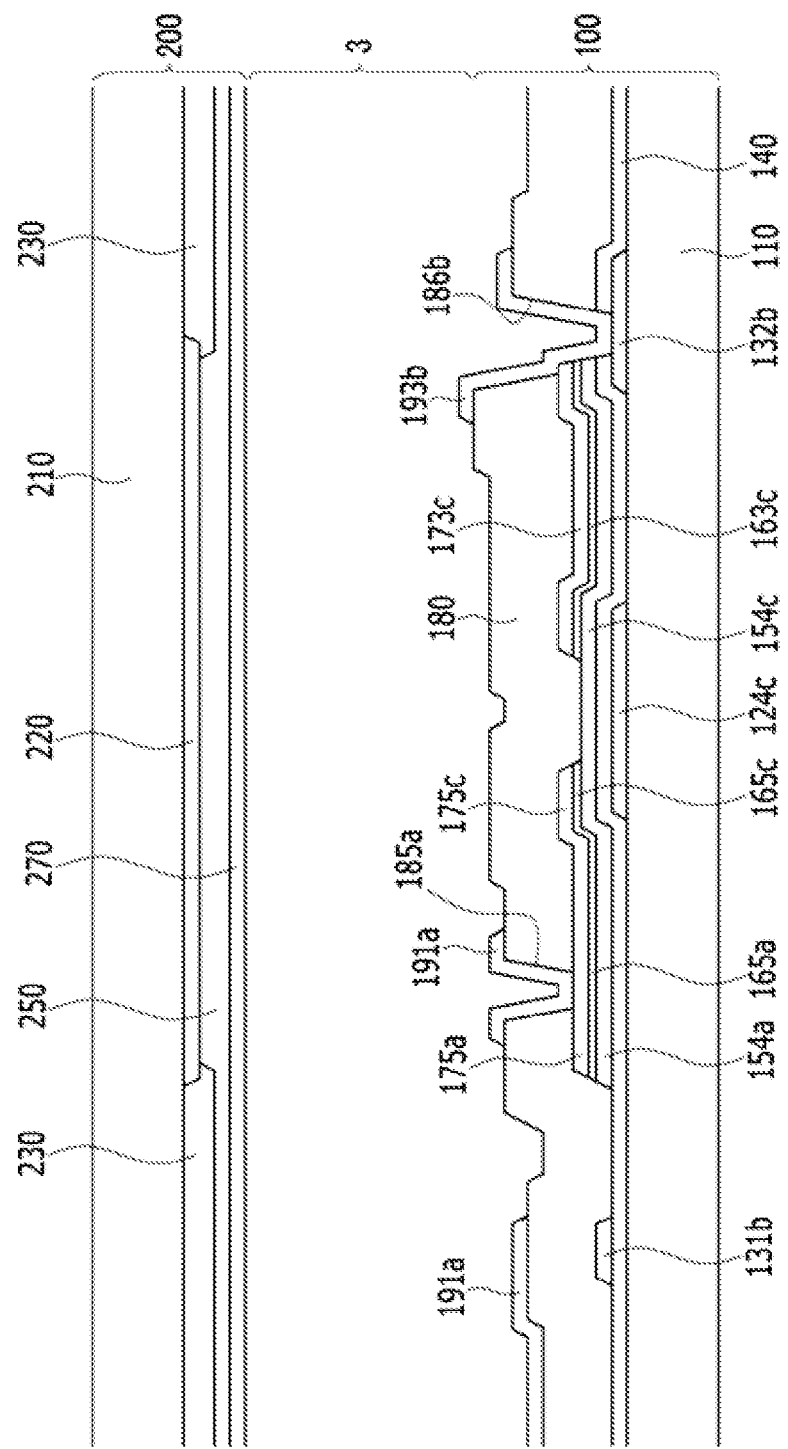
FIG. 3 is a cross-sectional view taken along line III-III of the liquid crystal display of FIG. 2.
Figure 4:
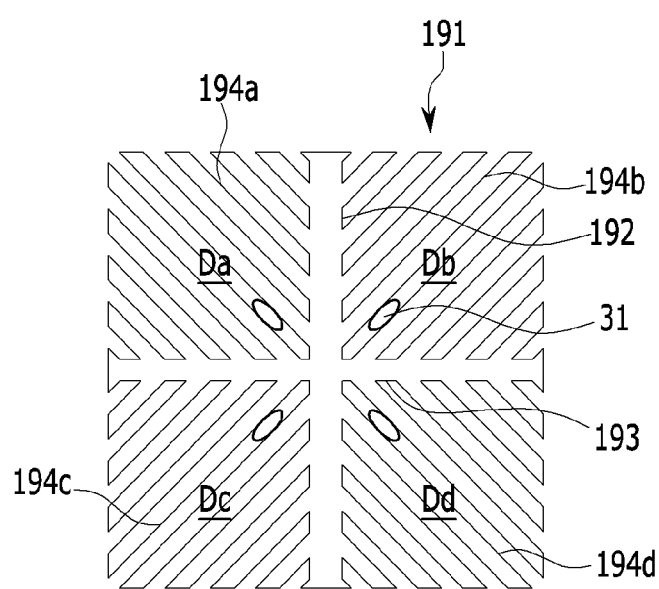
FIG. 4 is a top plan view of a unit region of a field generating electrode of an exemplary embodiment of the liquid crystal display according to the invention.
Figure 5:
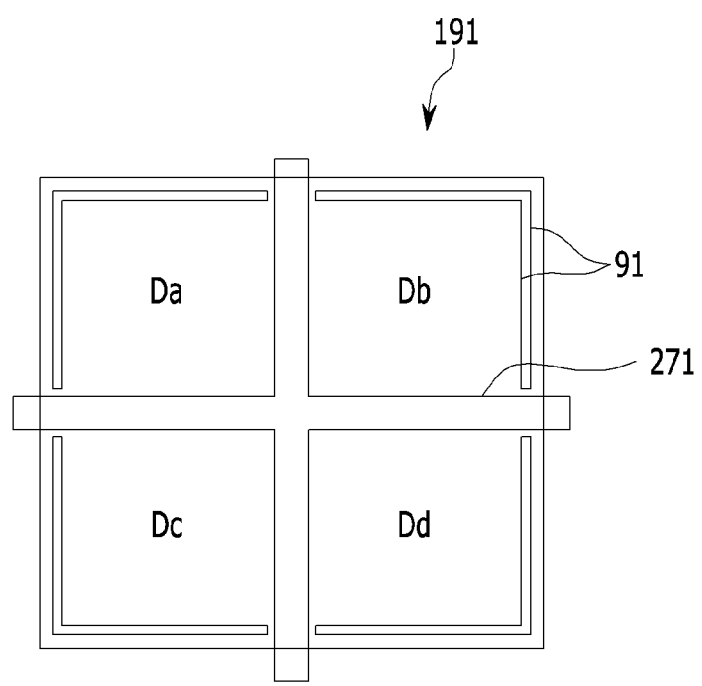
FIG. 5 is a top plan view of a unit region of a field generating electrode of an alternative exemplary embodiment of the liquid crystal display according to the invention.

Then, an exemplary embodiment of the liquid crystal display according to the invention will be described with reference to FIGS. 2 to 5. FIG. 2 is a top plan view of an exemplary embodiment of the liquid crystal display according to the invention, and FIG. 3 is a cross-sectional view taken along line III-III of the liquid crystal display of FIG. 2. FIG. 4 is a top plan view of a unit region of an exemplary embodiment of a field generating electrode of the liquid crystal display according to the invention, and FIG. 5 is a top plan view of a unit region of an alternative exemplary embodiment of a field generating electrode of the liquid crystal display according to the invention.

Referring to FIGS. 2 and 3, an exemplary embodiment of the liquid crystal display according to the invention includes two panels dispose opposite to each other, e.g., a lower panel 100 and an upper panel 200, and a liquid crystal layer 3 disposed between the two panels 100 and 200.

First, the lower panel 100 will be described.

The lower panel 100 includes a first insulation substrate 110. A gate conductor including a plurality of gate lines 121 and a plurality of reference voltage lines 131a and 131b is disposed on the first insulation substrate 110.

The gate line 121 transfers a gate signal, and includes a first gate electrode 124a, a second gate electrode 124b and a third gate electrode 124c.

The reference voltage lines 131a and 131b includes a first reference voltage line 131a that transfers a first reference voltage and a second reference voltage line 131b that transfers a second reference voltage. The first reference voltage line 131a and the second reference voltage line 131b are disposed at the left and the right sides of a pixel column which is disposed between two data lines 171. The first reference voltage line 131a includes a first extension 132a, and the second reference voltage line 131b includes a second extension 132b.

In an alternative exemplary embodiment of a liquid crystal display according to the invention, the reference voltage lines 131a and 131b may be disposed on the same layer as a data line 171, but not on the same layer as the gate line 121.

A gate insulating layer 140 is disposed on the gate line 121 and the reference voltage lines 131a and 131b.

A first semiconductor 154a, a second semiconductor 154b and a third semiconductor 154c are disposed on the gate insulating layer 140.

Ohmic contacts 165a, 163c and 165c are disposed on the first semiconductor 154a, the second semiconductor 154b and the third semiconductor 154c. In an exemplary embodiment, the semiconductors 154a, 154b and 154c may include an oxide semiconductor, and in such an embodiment where the semiconductors 154a, 154b and 154c include the oxide semiconductor, the ohmic contacts may be omitted.

A data conductor including the data line 171 including a first source electrode 173a and a second source electrode 173b, a third source electrode 173c, a first drain electrode 175a, a second drain electrode 175b and a third drain electrode 175c is disposed on the ohmic contacts 165a, 163c, and 165c and the gate insulating layer 140. The first drain electrode 175a and the third drain electrode 175c are connected to each other.

A passivation layer 180 is disposed on the data conductor. The passivation layer 180 may include an inorganic insulator or an organic insulator, for example.

A first contact hole 185a, which exposes a part of the first drain electrode 175a, and a second contact hole 185b, which exposes a part of the second drain electrode 175b, are formed in the passivation layer 180, and a third contact hole 186a, which exposes the first reference voltage line 131a, and a fourth contact hole 186b, which exposes the extension 132b of the second reference voltage line 131b, are formed in the gate insulating layer 140 and the passivation layer 180.

A first subpixel electrode 191a and a second subpixel electrode 191b, and a first connecting member 92a and a second connecting member 92b are disposed on the passivation layer 180.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b are disposed apart and separated from each other with the gate line 121 therebetween and disposed at the upper and lower sides of the pixel area with reference to the gate line 121 and adjacent to each other in a column direction. Exemplary embodiments of the first subpixel electrode 191a and the second subpixel electrode 191b may have various forms, as shown in FIG. 4 or 5.

An area occupied by the second subpixel electrode 191b may be greater than an area occupied by the first subpixel electrode 191a.

The first connecting member 92a connects the first extensions 132a of the first reference voltage line 131a, which are disposed at the upper and lower sides in a pixel column direction, and the gate line 121 therebetween, and the second connecting member 92b connects the second extensions 132b of the second reference voltage lines 131b, which are disposed at the upper and lower sides in a pixel column direction, and the gate line 121 therebetween.

The first gate electrode 124a, the first semiconductor 154a, the first source electrode 173a and the first drain electrode 175a collectively define a first switching element Qa, the second gate electrode 124b, the second semiconductor 154b, the second source electrode 173b and the second drain electrode 175b collectively define a second switching element Qb, and the third gate electrode 124c, the third semiconductor 154c, the third source electrode 173c and the third drain electrode 175c collectively define a third switching element Qc.

Then, the upper panel 200 will be described.

The upper panel 200 includes a second insulation substrate 210. A light blocking member 220 is positioned on the second insulation substrate 210. The light blocking member 220 is also referred to as a black matrix and blocks light leakage. A plurality of color filters 230 are disposed on the second insulation substrate 210 and light blocking member 220. An overcoat layer 250 is disposed on the color filter 230. The overcoat layer 250 prevents the color filters 230 and the light blocking member 220 from being detached and suppresses contamination of the liquid crystal layer 3 due to an organic material such as a solvent which is inputted from the color filter 230 to thereby effectively prevent a defect such as an afterimage which may occur during screen driving. In an alternative exemplary embodiment, the overcoat layer 250 may be omitted. A common electrode 270 is disposed on the overcoat layer 250.

In an exemplary embodiment of the liquid crystal display, as shown in FIG. 3, the light blocking member 220 and the color filters 230 are disposed on the upper panel 200, but not being limited thereto. In an alternative exemplary embodiment, the light blocking member 220 and the color filters 230 of the liquid crystal display may be disposed on the lower panel 100. In such an embodiment, the color filter 230 may be disposed in the same layer as the passivation layer 180 of the lower panel 100, and the passivation layer 180 may be omitted.

The first subpixel electrode 191a and the common electrode 270 form the first liquid crystal capacitor Clca together with the liquid crystal layer 3 therebetween, and the second subpixel electrode 191b and the common electrode 270 form the second liquid crystal capacitor Clcb together with the liquid crystal layer 3 therebetween.

The first subpixel electrode 191a overlaps the first reference voltage line 131a and the second reference voltage line 131b, which are disposed at the left and right sides, respectively, to form the first storage capacitor Cst1 and the second storage capacitor Cst2 and reinforce a voltage storage capacity of the first liquid crystal capacitor Clca. The second subpixel electrode 191b overlaps the first reference voltage line 131a and the second reference voltage line 131b, which are disposed at the left and right sides to form the third storage capacitor Cst3 and the fourth storage capacitor Cst4, respectively, and reinforce a voltage storage capacity of the second liquid crystal capacitor Clcb.

An electric field is generated in the liquid crystal layer 3 by the voltages, which are applied to the first subpixel electrode 191a and the second subpixel electrode 191b, and the common voltage, which is applied to the common electrode 270, and directions of the liquid crystal molecules of the liquid crystal layer 3 is determined based on the electric field generated therein. As described above, luminance of light which passes through the liquid crystal layer 3 is determined based on the direction of the liquid crystal molecule.

Then, a unit electrode of an exemplary embodiment of the liquid crystal display according to the invention will be described with reference to FIG. 4.

Referring to FIG. 4, in an exemplary embodiment, the overall shape of a unit electrode 191 is a quadrangle, the unit electrode 191 includes a cross stem which includes a horizontal stem 193 and a vertical stem 192, substantially perpendicular to each other. In such an embodiment, the unit electrode 191 is divided into a first subregion Da, a second subregion Db, a third subregion Dc and a fourth subregion Dd by the horizontal stem 193 and the vertical stem 192, and the first to fourth subregions Da to Dd include first to fourth minute branches 194a, 194b, 194c and 194d, respectively.

The first minute branch 194a obliquely extends toward the upper left direction from the horizontal stem 193 or the vertical stem 192, and the second minute branch 194b obliquely extends toward the upper right direction from the horizontal stem 193 or the vertical stem 192. The third minute branch 194c extends toward the lower left direction from the horizontal stem 193 or the vertical stem 192, and the fourth minute branch 194d obliquely extends toward the lower right direction from the horizontal stem 193 or the vertical stem 192.

The first to fourth minute branches 194a, 194b, 194c and 194d form angles of about 45 degrees or 135 degrees with the gate lines 121a and 121b or the horizontal stem 193. The minute branches 194a, 194b, 194c and 194d of the two adjacent subregions Da, Db, Dc and Dd may be substantially perpendicular to each other.

When the electric field is applied to the liquid crystal layer 3, sides of the first to fourth minute branches 194a, 194b, 194c and 194d form a fringe field. As a result, the liquid crystal molecules 31 are inclined substantially parallel to longitudinal directions of the minute branches 194a, 194b, 194c and 194d.

Since the unit electrode 191 includes the four subregions Da to Dd which have different longitudinal directions of the minute branches 194a, 194b, 194c and 194d, the inclined directions of the liquid crystal molecules 31 are substantially four directions, and four domains which have different alignment directions of the liquid crystal molecules 31 are formed on the liquid crystal layer 3. As described above, when the inclined directions of the liquid crystal molecules are varied, a reference viewing angle of the liquid crystal display is increased.

Then, an alternative exemplary embodiment of a unit electrode 191 of a liquid crystal display according to the invention will be described with reference to FIG. 5.

Referring to FIG. 5, the unit electrode 191 includes a first cutout 271 of the common electrode 270 which faces the subpixel electrodes 191a and 191b, and second cutouts 91 of the subpixel electrodes 191a and 191b which are formed around edges of the subpixel electrodes 191a and 191b.

When viewing the liquid crystal display from the top, a unit region defined by the first cutout 271 of the common electrode 270 and the edges of the subpixel electrodes 191a and 191b may be divided into a plurality of subregions Da, Db, Dc and Dd, and the subregions may be symmetrical to each other with respect to the first cutout 271 of the common electrode 270.

The first cutout 271 of the common electrode 270 may have a cross form when viewed from a top view, and the edge of the first cutout 271 more protrudes than the edges of the corresponding subpixel electrodes 191a and 191b.

The second cutouts 91 of the subpixel electrodes 191a and 191b are formed in a substantially quadrangular ring shape along the edges of the subpixel electrodes 191a and 191b, and are disconnected in the vicinity of a portion which corresponds to an end of the first cutout 271 of the common electrode 270.

In an exemplary embodiment of the liquid crystal display, as shown in FIG. 5, the cross-shaped cutout is formed on the common electrode, but not be limited thereto. In an exemplary embodiment, the cross-shaped cutout may be formed on at least one of the pixel electrode and the common electrode which are field generating electrodes. In an exemplary embodiment, the cross-shaped cutout may be formed on the pixel electrode. In one exemplary embodiment, for example, the cross-shaped cutout may be formed on both the pixel electrode and the common electrode.

When the electric field is generated in the liquid crystal layer 3, by the fringe field formed by the edges of the subpixel electrodes 191a and 191b and the first cross-shaped cutout 271 of the common electrode 270, the liquid crystal molecules 31 of the liquid crystal layer 3 are inclined to be substantially parallel to a direction which faces the center of the first cross-shaped cutout 271 of the common electrode 270 from four portions where the edges of subpixel electrodes 191a and 191b extending in different directions meet, and the inclined directions of the liquid crystal molecules 31 are substantially four directions in one unit region of the field generating electrodes. As described above, the inclined directions of the liquid crystal molecules include a plurality of directions in one unit region of the liquid crystal display, such that the viewing angle of the liquid crystal display is increased.

As described above, in an exemplary embodiment, the first subpixel electrode 191a overlaps the first reference voltage line 131a and the second reference voltage line 131b, which are disposed at the left and right sides thereof, to form the first storage capacitor Cst1 and the second storage capacitor Cst2, which reinforce a voltage storage capacity of the first liquid crystal capacitor Clca. The second subpixel electrode 191b overlaps the first reference voltage line 131a and the second reference voltage line 131b, which are disposed at the left and right sides thereof, to form the third storage capacitor Cst3 and the fourth storage capacitor Cst4, which reinforce a voltage storage capacity of the second liquid crystal capacitor Clcb.

In an exemplary embodiment, the first reference voltage and second reference voltage which have a predetermined magnitude are applied to the first reference voltage line 131a and the second reference voltage line 131b, and polarities of the first reference voltage and the second reference voltage are changed in each frame. In one exemplary embodiment, for example, where the magnitude of common voltage is about 7.5 V, the first reference voltage and the second reference voltage may have values of about 15 V and about zero (0) V, or zero (0) V and about 15 V, respectively, in each frame. The first reference voltage and the second reference voltage may be greater or less than a maximum value of the data voltage. In an exemplary embodiment, where the first reference voltage and the second reference voltage have positive polarities with reference to the common voltage, differences between the first reference voltage and the common voltage, and between the second reference voltage and the common voltage may be different from differences between the first reference voltage and the common voltage, and between the second reference voltage and the common voltage when the first reference voltage and the second reference voltage have negative polarities with reference to the common voltage.

Figure 6:
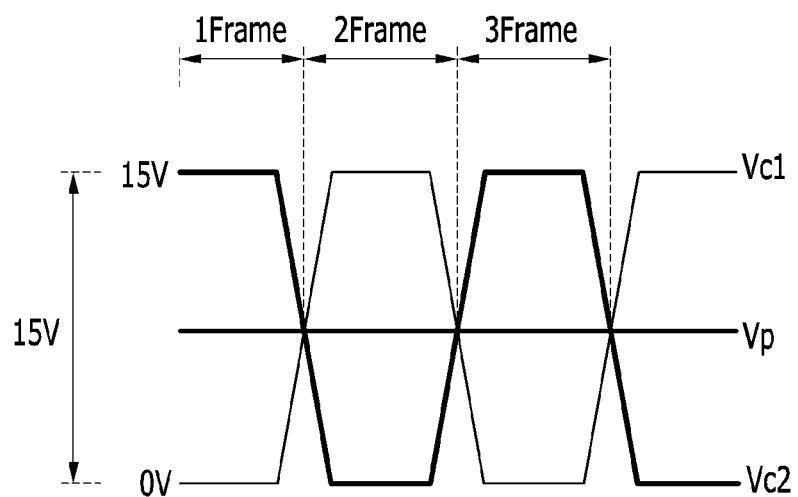
FIG. 6 is a signal timing diagram showing a voltage change of a pixel area according to reference voltages applied in each frame.

In an exemplary embodiment, the subpixel electrodes 191a and 191b respectively overlap the first reference voltage line 131a and the second reference voltage line 131b, to which the first reference voltage and second reference voltage having different polarities are applied, to form the storage capacitor. Accordingly, in such an embodiment, when the polarities of the first reference voltage and the second reference voltage are changed in each frame, the pixel voltage is not changed or substantially constant. The pixel voltage of an exemplary embodiment of the liquid crystal display will be described in greater detail with reference to FIG. 6. FIG. 6 is a signal timing diagram showing a voltage change of a pixel area according to reference voltages applied in each frame.

Referring to FIG. 6, in an exemplary embodiment, first reference voltage Vc1 applied to the first reference voltage line 131a has a value of about zero (0) V in a first frame 1Frame, has a value of about 15 V in a second frame 2 Frame, and has a value of about zero (0) V in a third frame 3 Frame. In such an embodiment, second reference voltage Vc2 applied to the second reference voltage line 131b has a value of about 15 V in the first frame 1Frame, has a value of about zero (0) V in the second frame 2 Frame, and has a value of about 15 V in the third frame 3 Frame.

As described above, in an exemplary embodiment, where the subpixel electrodes 191a and 191b overlap the first reference voltage line 131a and the second reference voltage line 131b, when polarities of the first reference voltage Vc1 and second reference voltage Vc2, which are opposite to each other, are changed in each frame, changes in storage capacitance of the storage capacitors according to the polarity change of the first reference voltage Vc1 and the second reference voltage Vc2 are offset, such that a magnitude of voltage Vp, which is charged in each of the subpixel electrodes 191a and 191b, is substantially uniformly maintained.

In an exemplary embodiment of the liquid crystal display according to the invention, the pixel electrode is divided into the first subpixel electrode and the second subpixel electrode, substantially the same data voltage is applied to the first subpixel electrode and the second subpixel electrode, and the thin film transistor connected to the first subpixel electrode and the reference voltage line is included therein, such that the voltage of the first subpixel electrode is controlled to be higher than the data voltage. Accordingly, a gray change in a low gray region is substantially smoothly controlled, and the grayscale level in the low gray region is thereby accurately expressed, such that high luminance is effectively obtained, and side visibility is substantially close to the front visibility, thereby substantially improving the visibility.

Figure 7:
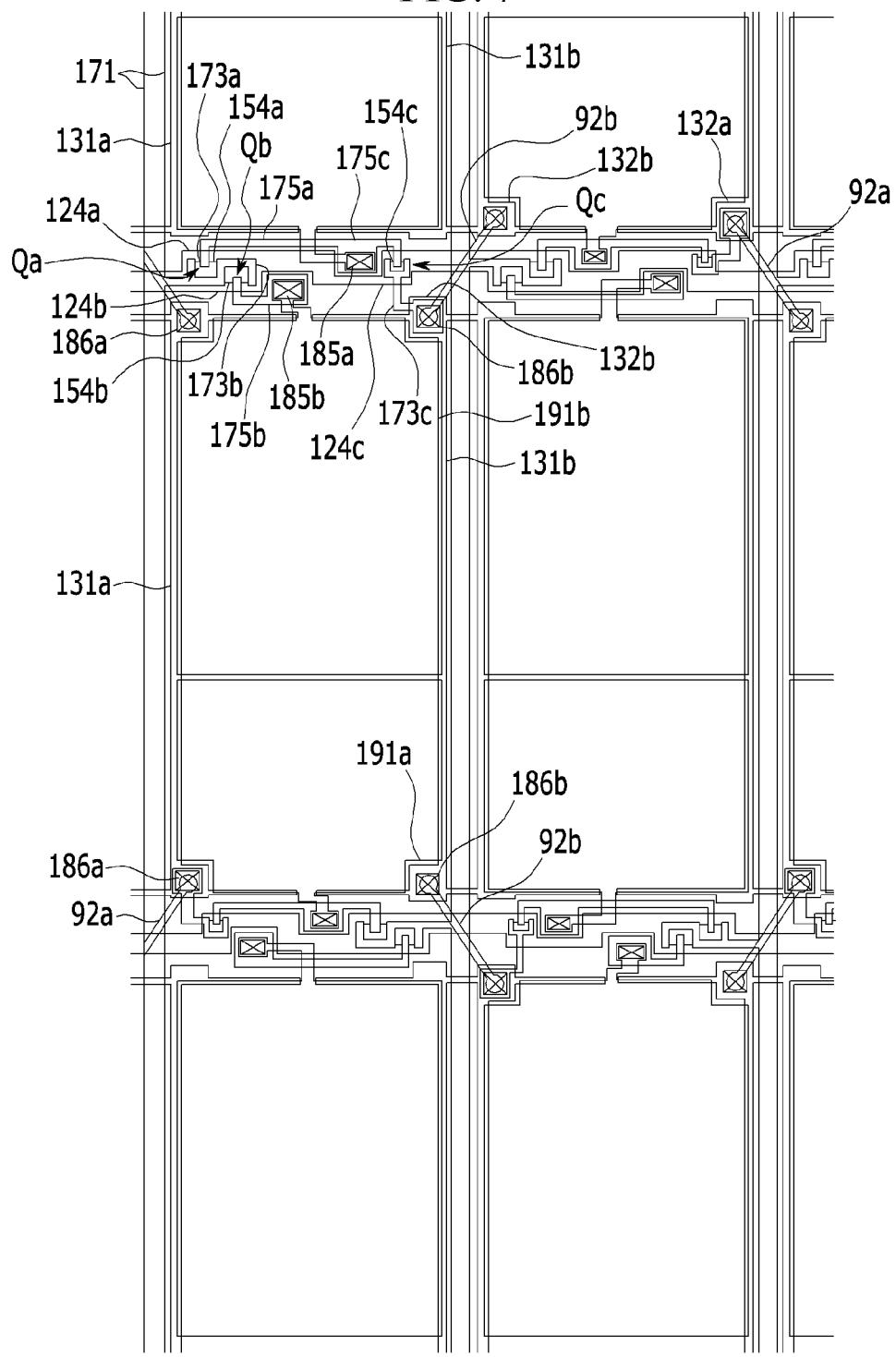
FIG. 7 is a top plan view of an alternative exemplary embodiment of a liquid crystal display according to the invention.

Hereinafter, an alternative exemplary embodiment of a liquid crystal display according to the invention will be described with reference to FIG. 7. FIG. 7 is a top plan view of an alternative exemplary embodiment of a liquid crystal display according to the invention.

The liquid crystal display in FIG. 7 is substantially similar to the liquid crystal display described with reference to FIGS. 2 to 6. The same or like elements shown in FIG. 7 have been labeled with the same reference characters as used above to describe the exemplary embodiments of the liquid crystal display shown in FIGS. 2 to 5, and any repetitive detailed description thereof will hereinafter be omitted or simplified.

In an alternative exemplary embodiment of the liquid crystal display, as shown in FIG. 7, the third contact hole 186a and the fourth contact hole 186b which expose the first reference voltage line 131a and the second reference voltage line 131b are formed only in a portion which is adjacent to any one of the two subpixel electrodes 191a and 191b disposed in a pixel area. In such an embodiment, the first connecting member 92a is disposed to connecting the first reference voltage line 131a which is disposed in two adjacent pixel areas with the data line 171 therebetween, and the second connecting member 92b is disposed to connect the second reference voltage line 131b which is disposed in two adjacent pixel areas with the data line 171 therebetween.

In such an embodiment, the third contact hole 186a and the fourth contact hole 186b which expose the first reference voltage line 131a and the second reference voltage line 131b are formed only at the portion which is adjacent to any one of the two subpixel electrodes 191a and 191b disposed in a pixel area, thereby substantially increasing an aperture ratio of the liquid crystal display.

Other features of the exemplary embodiment of the liquid crystal display described with reference to FIGS. 2 to 6 may be applied to the exemplary embodiment of the liquid crystal display in FIG. 7.

Figure 8:
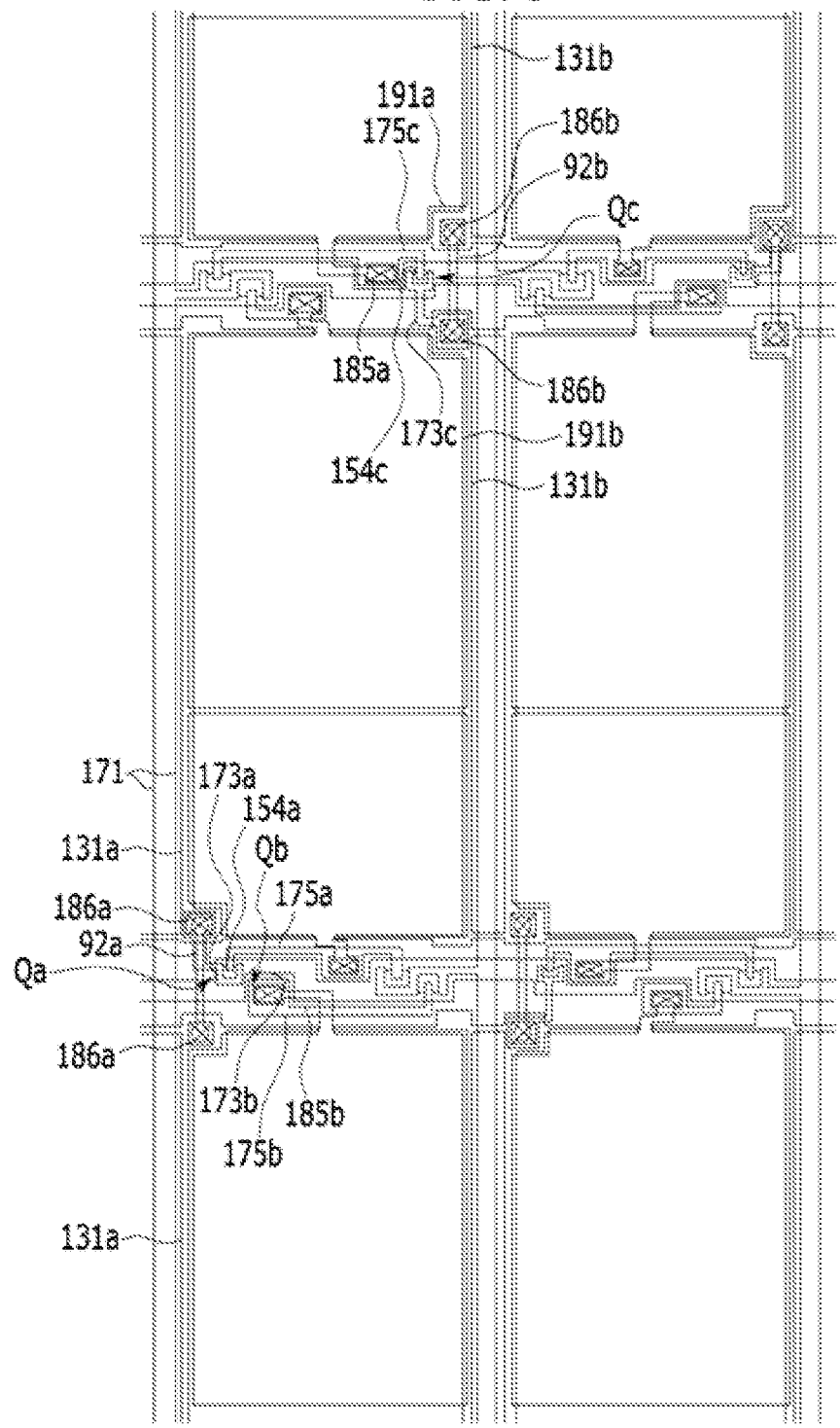
FIG. 8 is a top plan view of another alternative exemplary embodiment of the liquid crystal display according to the invention.

Then, another alternative exemplary embodiment of a liquid crystal display according to the invention will be described with reference to FIG. 8. FIG. 8 is a top plan view of another alternative exemplary embodiment of the liquid crystal display according to the invention.

The liquid crystal display of FIG. 8 is substantially similar to the exemplary embodiments of the liquid crystal display described with reference to FIGS. 2 to 5 and described with reference to FIG. 6. The same or like elements shown in FIG. 8 have been labeled with the same reference characters as used above to describe the exemplary embodiments of the liquid crystal display shown in FIGS. 2 to 5, and any repetitive detailed description thereof will hereinafter be omitted or simplified.

In another alternative exemplary embodiment of the liquid crystal display, the third contact hole 186a and the fourth contact hole 186b, which expose the first reference voltage line 131a and the second reference voltage line 131b, are disposed in one pixel area of two pixel areas which are adjacent to each other in a pixel column direction. In such an embodiment, the first connecting member 92a and the second connecting member 92b are disposed in one pixel area of two pixel areas which are adjacent to each other in a pixel column direction.

In such an embodiment, the third contact hole 186a and the fourth contact hole 186b which expose the first reference voltage line 131a and the second reference voltage line 131b are disposed only in one pixel area of two pixel areas which are adjacent to each other in a pixel column direction, thereby substantially increasing an aperture ratio of the liquid crystal display.

Other features of the exemplary embodiment of the liquid crystal display described with reference to FIGS. 2 to 6 may be applied to the exemplary embodiment of the liquid crystal display in FIG. 8.

Figure 9:
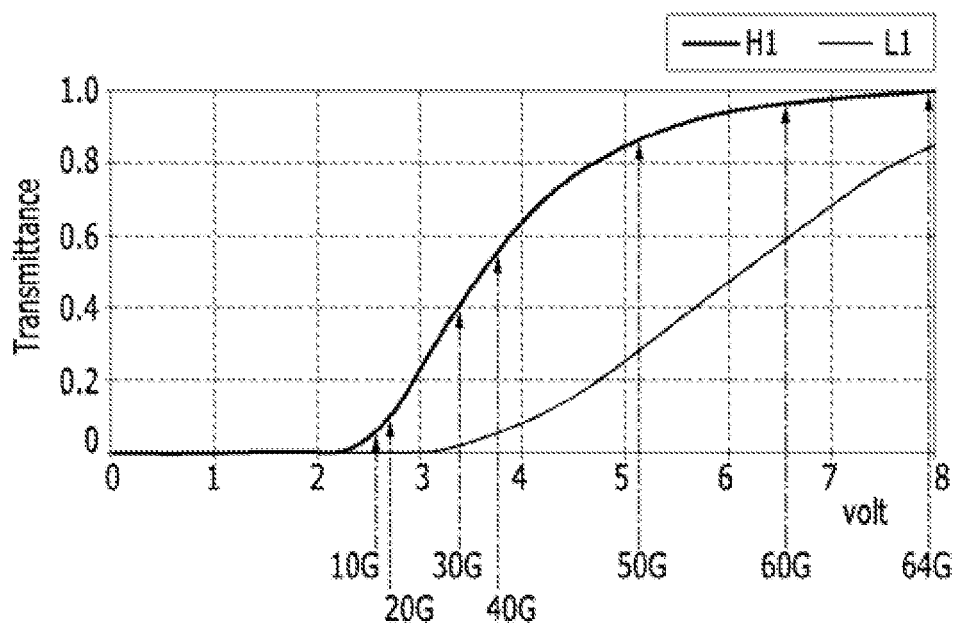
FIGS. 9 and 10 are graphs illustrating a transmittance change depending on pixel voltage of a liquid crystal display according to an Experimental Example of the invention.
Figure 10:
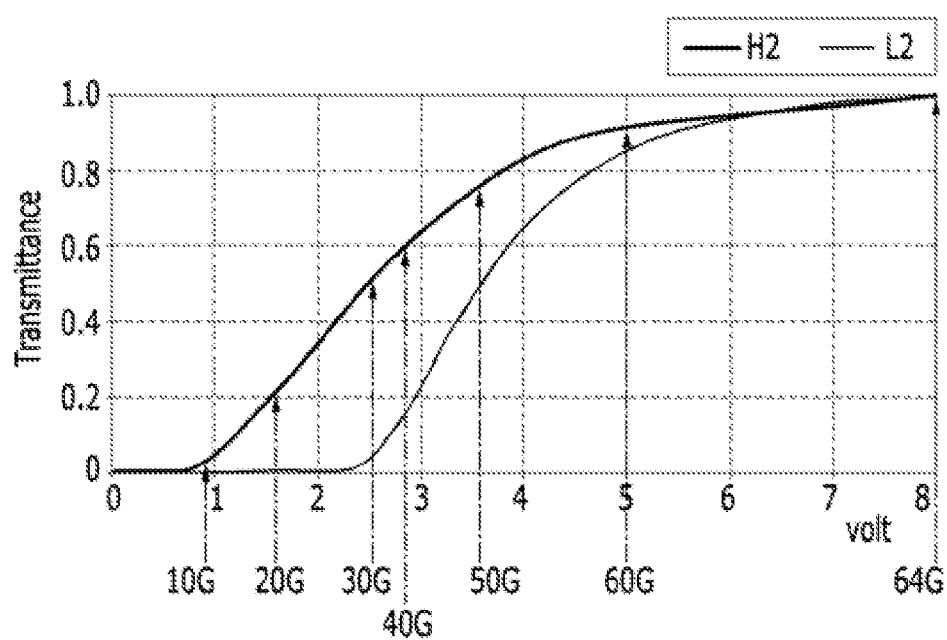

Then, a transmittance change depending on pixel voltage of a liquid crystal display according to an exemplary experiment will be described with reference to FIGS. 9 and 10. FIGS. 9 and 10 are graphs illustrating a transmittance change according to pixel voltage of an exemplary embodiment of a liquid crystal display according to the invention.

FIG. 9 shows a transmittance change H1 according to the data voltage applied to the first subpixel electrode and a transmittance change L1 according to the data voltage applied to the second subpixel electrode in a comparative conventional embodiment of the liquid crystal display, where a pixel electrode is divided into a first subpixel electrode and a second subpixel electrode and voltage applied to the second subpixel electrode is divided to control the voltage applied to the second subpixel electrode to be lower than inputted data voltage.

FIG. 10 shows a transmittance change H2 according to the data voltage applied to the first subpixel electrode and a transmittance change L2 according to the data voltage applied to the second subpixel electrode in an exemplary embodiment of the liquid crystal display, where a pixel electrode is divided into a first subpixel electrode and a second subpixel electrode to control the voltage applied to the first subpixel electrode to be higher than inputted data voltage.

First, referring to FIG. 9, the voltage of the second subpixel electrode of the first subpixel electrode and the second subpixel electrode, to which substantially the same data voltage is applied through the data line, is lowered by a predetermined value. Accordingly, in the case where a value of inputted data voltage is relatively low, for example, the data voltage is about 4 V or less, the entire transmittance depends on only the transmittance H1 of the first subpixel electrode. Therefore, the transmittance is not substantially changed in a low gray region, for example, the grayscale value of about 20 (20G), and as a result, the grayscale level corresponding thereto may not be effectively expressed. Further, from the grayscale value of about 20 (20G) to the grayscale value of about 40 (40G), a rate of increase in the transmittance with a change in the applied data voltage is increased, and thus the transmittance is rapidly increased, and as a result, a phenomenon, in which a screen is shown by white, may occur such that the grayscale level depending on the data voltage in the low gray region may not be effectively expressed. Further, in the case of a high gray region, and for example, where the data voltage is about 6.7 V or more, the transmittance depending on the voltage of the second subpixel electrode is decreased, and thus the entire transmittance of the liquid crystal display is lowered, and transmittance efficiency of the liquid crystal display is thereby lowered.

Referring now to FIG. 10, the voltage of the first subpixel electrode of the first subpixel electrode and the second subpixel electrode, to which substantially the same voltage is applied through the data line, is increased by a predetermined value. Accordingly, substantial change in the transmittance according to the applied data voltage occurs in the low gray region, and thus the grayscale level in the low gray is effectively expressed. Further, the rate of increase in the transmittance with a change in the applied data voltage is substantially constant in the low gray region, and thus the transmittance is rapidly increased in a predetermined gray such that a phenomenon, in which a screen is shown by white, is effectively prevented. Further, in the case of a high gray region, and for example, where the data voltage is about 6.7 V or more, the transmittance is not substantially decreased or maintained substantially constantly such that the entire transmittance of the liquid crystal display is increased, and driving efficiency of the liquid crystal display is thereby increased.

Figure 11:
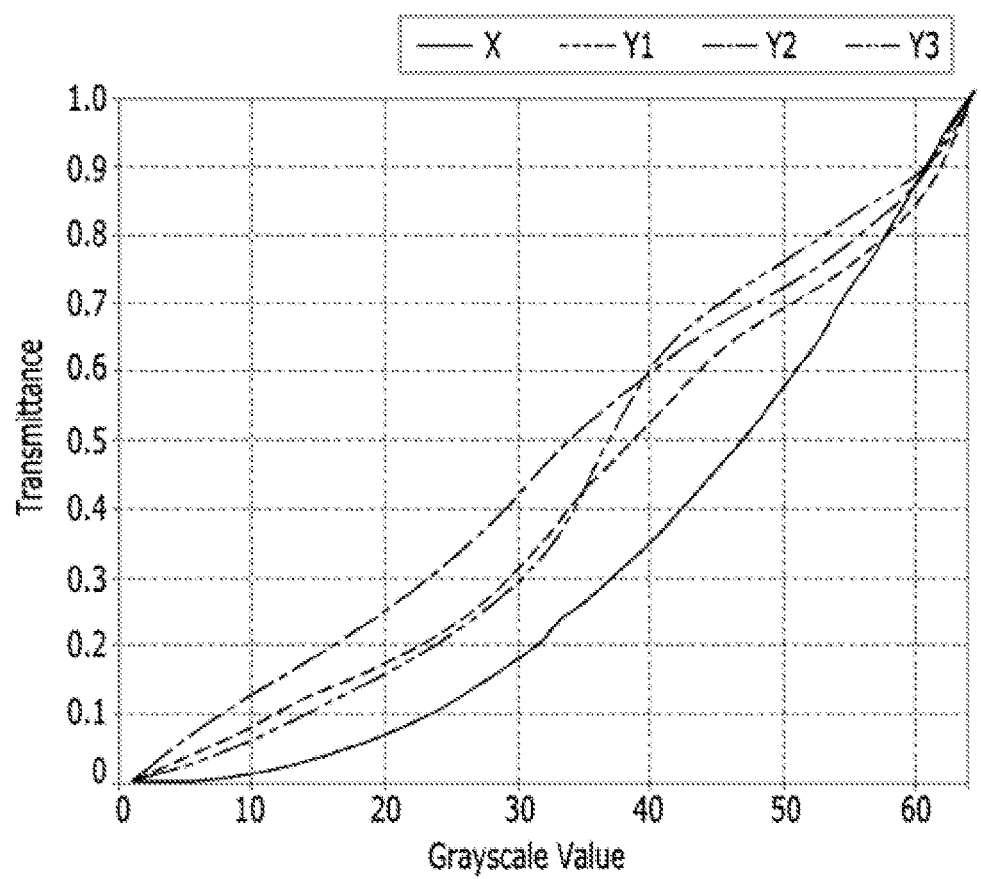
FIG. 11 is a graph illustrating a transmittance change depending on a gray of the liquid crystal display according to the Experimental Example of the invention.

Then, a transmittance change according to grayscale values in an exemplary embodiment of the liquid crystal display according to the exemplary experiment will be described with reference to FIG. 11. FIG. 11 is a graph illustrating a transmittance change according to grayscale values of the liquid crystal display according to the exemplary experiment.

FIG. 11 shows transmittances measured in the exemplary experiment. In FIG. 11, a transmittance change X in each grayscale level in the front, a transmittance change Y1 in each grayscale level in the case where the pixel electrode is divided into the first subpixel electrode and the second subpixel electrode and then different data voltages are applied to the first subpixel electrode and the second subpixel electrode, a transmittance change Y2 in each grayscale level in the side in the case where the pixel electrode is divided into the first subpixel electrode and the second subpixel electrode and then the voltage applied to the second subpixel electrode is divided to control the voltage applied to the second subpixel electrode to be lower than the inputted data voltage as in a conventional liquid crystal display, and a transmittance change Y3 in each grayscale level in the case where the pixel electrode is divided into the first subpixel electrode and the second subpixel electrode to control the voltage applied to the first subpixel electrode to be higher than the inputted data voltage as in an exemplary embodiment of the liquid crystal display according to the invention are shown.

Referring to FIG. 11, as compared with the cases Y1 and Y2, in the case Y3 corresponding to an exemplary embodiment of the liquid crystal display according to the invention, side transmittance is substantially close to front transmittance in the low gray region, for example, a grayscale value of about 30 (30G) or less, and the transmittance is substantially gradually changed according to the grayscale value. As shown in FIG. 11, in an exemplary embodiment of the liquid crystal display according to the invention, the grayscale level in the low gray region is effectively expressed, high luminance is effectively obtained, and side visibility is substantially close to the front visibility, thereby substantially improving the visibility.

Figure 12:
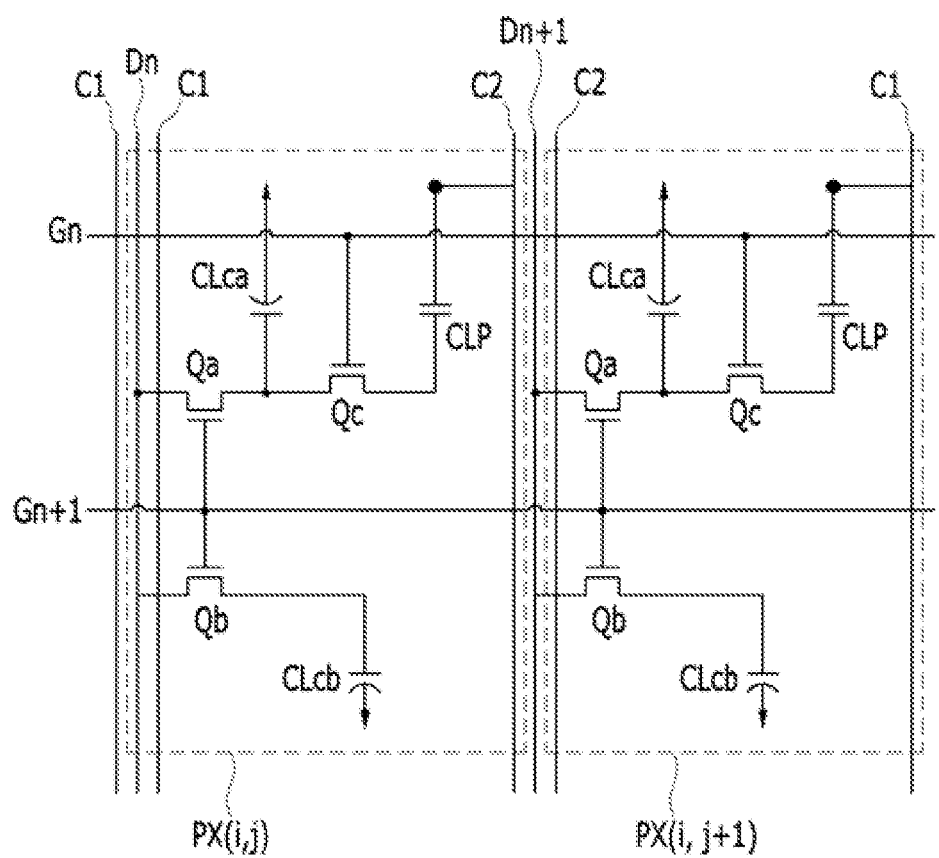
FIG. 12 is an equivalent circuit diagram of two pixels of an alternative exemplary embodiment of the liquid crystal display according to the invention.

Then, another alternative exemplary embodiment of a liquid crystal display according to the invention will be described with reference to FIG. 12. FIG. 12 is an equivalent circuit diagram of two pixels of an alternative exemplary embodiment of the liquid crystal display according to the invention.

Referring to FIG. 12, an exemplary embodiment of the liquid crystal display includes a first pixel PX(i, j) and a second pixel PX(i, j+1), which are adjacent to each other in a pixel row direction, and a plurality of signal lines Gn, Gn+1, Dn, Dn+1, C1, and C2, which are connected to the first and second pixels PX(i, j) and PX(i, j+1). The signal lines Gn, Gn+1, Dn, Dn+1, C1, and C2 include a plurality of gate lines, e.g., first and second gate lines Gn and Gn+1, which transfer gate signals, a plurality of data lines, e.g., first and second data lines Dn and Dn+1, which transfer data voltages, and a plurality of reference voltage lines, e.g., first and second reference voltage lines C1 and C2, which transfer predetermined reference voltages. The reference voltage lines C1 and C2 include the first reference voltage line C1 and the second reference voltage line C2, which transfer reference voltages having different polarities. First reference voltage and second reference voltage which have a predetermined magnitude are applied to the first reference voltage line C1 and the second reference voltage line C2, respectively, and polarities of the first reference voltage and the second reference voltage are changed for each frame. In one exemplary embodiment, for example, where the magnitude of common voltage is about 7.5 V, the first reference voltage and the second reference voltage may have a value of about 15 V and about 0 V, or about 0 V and about 15 V, respectively, in each frame. The first reference voltage and the second reference voltage may be greater or less than a maximum value of the data voltage. In an exemplary embodiment, when the first reference voltage and the second reference voltage have positive polarities with reference to the common voltage, the differences between the first reference voltage and the common voltage, and between the second reference voltage and the common voltage may be different from the differences between the first reference voltage and the common voltage, and between the second reference voltage and the common voltage when the first reference voltage and the second reference voltage have negative polarities with reference to the common voltage.

The first pixel PX(i, j) includes a first switching element Qa, a second switching element Qb, a third switching element Qc, a first liquid crystal capacitor Clca, a second liquid crystal capacitor Clcb and a boosting capacitor CLP, and the first gate line Gn and the second gate line Gn+1, the first data line Dn and the second reference voltage line C2 are connected thereto.

The first switching element Qa of the first pixel PX(i, j) and the second switching element Qb of the first pixel PX(i, j) are connected to the first gate line Gn and the first data line Dn, and the third switching element Qc of the first pixel PX(i, j) is connected to the second gate line Gn+1, one terminal, e.g., a first terminal, of the boosting capacitor CLP of the first pixel PX(i, j) and an output terminal of the first switching element Qa of the first pixel PX(i, j).

In an exemplary embodiment, the first switching element Qa of the first pixel PX(i, j) and the second switching element Qb of the first pixel PX(i, j) are three-terminal elements such as a thin film transistor, of which a control terminal is connected to the first gate line Gn, and an input terminal is connected to the first data line Dn. In such an embodiment, the output terminal of the first switching element Qa of the first pixel PX(i, j) is connected to the first liquid crystal capacitor Clca of the first pixel PX(i, j) and an output terminal of the third switching element Qc of the first pixel PX(i, j), and the output terminal of the second switching element Qb of the first pixel PX(i, j) is connected to the second liquid crystal capacitor Clcb of the first pixel PX(i, j).

The third switching element Qc of the first pixel PX(i, j) is a three-terminal element such as a thin film transistor, of which a control terminal is connected to the second gate line Gn+1, an input terminal is connected to one terminal, e.g., a first terminal, of the boosting capacitor CLP of the first pixel PX(i, j), and an output terminal is connected with the first liquid crystal capacitor Clca of the first pixel PX(i, j). The other terminal, e.g., a second terminal, of the boosting capacitor CLP of the first pixel PX(i, j) is connected to the second reference voltage line C2.

The second pixel PX(i, j+1) includes a first switching element Qa, a second switching element Qb, a third switching element Qc, a first liquid crystal capacitor Clca, a second liquid crystal capacitor Clcb and a boosting capacitor CLP, and the first gate line Gn, the second data line Dn+1 and the first reference voltage line C1 are connected thereto.

Control terminals of the first switching element Qa and the second switching element Qb of the second pixel PX(i, j+1) are connected to the first gate line Gn, and input terminals of the first switching element Qa and the second switching element Qb of the second pixel PX(i, j+1) are connected to the second data line Dn+1.

An output terminal of the first switching element Qa of the second pixel PX(i, j+1) is connected to the first liquid crystal capacitor Clca of the second pixel PX(i, j+1) and the output terminal of the third switching element Qc of the second pixel PX(i, j+1), and an output terminal of the second switching element Qb of the second pixel PX(i, j+1) is connected to the second liquid crystal capacitor Clcb of the second pixel PX(i, j+1).

A control terminal of the third switching element Qc of the second pixel PX(i, j+1) is connected to the second gate line Gn+1, an input terminal is connected to one terminal of the boosting capacitor CLP of the second pixel PX(i, j+1), and an output terminal is connected with the first liquid crystal capacitor Clca of the second pixel PX(i, j+1). The other terminal of the boosting capacitor CLP of the second pixel PX(i, j+1) is connected to the first reference voltage line C1 of the second pixel PX(i, j+1).

When a gate-on signal is applied to the first gate line Gn, the first switching elements Qa and the second switching elements Qb of the first pixel PX(i, j) and the second pixel PX(i, j+1), which are connected to the first gate line Gn, are turned on. Accordingly, the data voltage applied to the first data line Dn is connected to one terminal of the first liquid crystal capacitor Clca and the second liquid crystal capacitor Clcb of the first pixel PX(i, j) through the turned-on first switching element Qa and second switching element Qb of the first pixel PX(i, j), and the data voltage applied to the second data line Dn+1 is connected to one terminal of the first liquid crystal capacitor Clca and the second liquid crystal capacitor Clcb of the second pixel PX(i, j+1) through the turned-on first switching element Qa and second switching element Qb of the second pixel PX(i, j+1). Then, the first liquid crystal capacitor Clca and the second liquid crystal capacitor Clcb of the first pixel PX(i, j) are charged to substantially the same voltage, and the first liquid crystal capacitor Clca and the second liquid crystal capacitor Clcb of the second pixel PX(i, j+1) are charged to substantially the same voltage.

When a gate-off signal is applied to the first gate line Gn and the gate-on signal is applied to the second gate line Gn+1, the first switching elements Qa and the second switching elements Qb of the first pixel PX(i, j) and the second pixel PX(i, j+1) are turned off, and the first liquid crystal capacitors Clca and the second liquid crystal capacitors Clcb of the first pixel PX(i, j) and the second pixel PX(i, j+1) are floated. Then, the third switching elements Qc of the first pixel PX(i, j) and the second pixel PX(i, j+1) are turned on. One terminal of the boosting capacitor CLP, which is connected to the third switching element Qc, is connected to the first reference voltage line C1 or the second reference voltage line C2, and the first reference voltage and the second reference voltage which are applied to the first reference voltage line C1 or the second reference voltage line C2 may have a higher value than the data voltage. Accordingly, the voltage of the other terminal of the boosting capacitor CLP is increased. As described above, the increased voltage is transferred to the second liquid crystal capacitor Clcb through the third switching element Qc, and thus the charged voltage of the second liquid crystal capacitor Clcb is substantially increased.

In an exemplary embodiment, as described above, the voltage of the first subpixel electrode 191a is increased with respect to the data voltage through the boosting capacitor CLP, such that the charged voltage of the first liquid crystal capacitor Clca and the charged voltage of the second liquid crystal capacitor Clcb become different from each other. In such an embodiment, where the charged voltage of the first liquid crystal capacitor Clca and the charged voltage of the second liquid crystal capacitor Clcb are different from each other, inclined angles of the liquid crystal molecules are different from each other in the first subpixel and the second subpixel, and thus luminances of two subpixels are different from each other. Accordingly, an image viewed from the side may be substantially close to an image viewed from the front by effectively controlling the voltage charged in the first liquid crystal capacitor Clca and the voltage charged in the second liquid crystal capacitor Clcb, thereby substantially improving side visibility.

Figure 13:
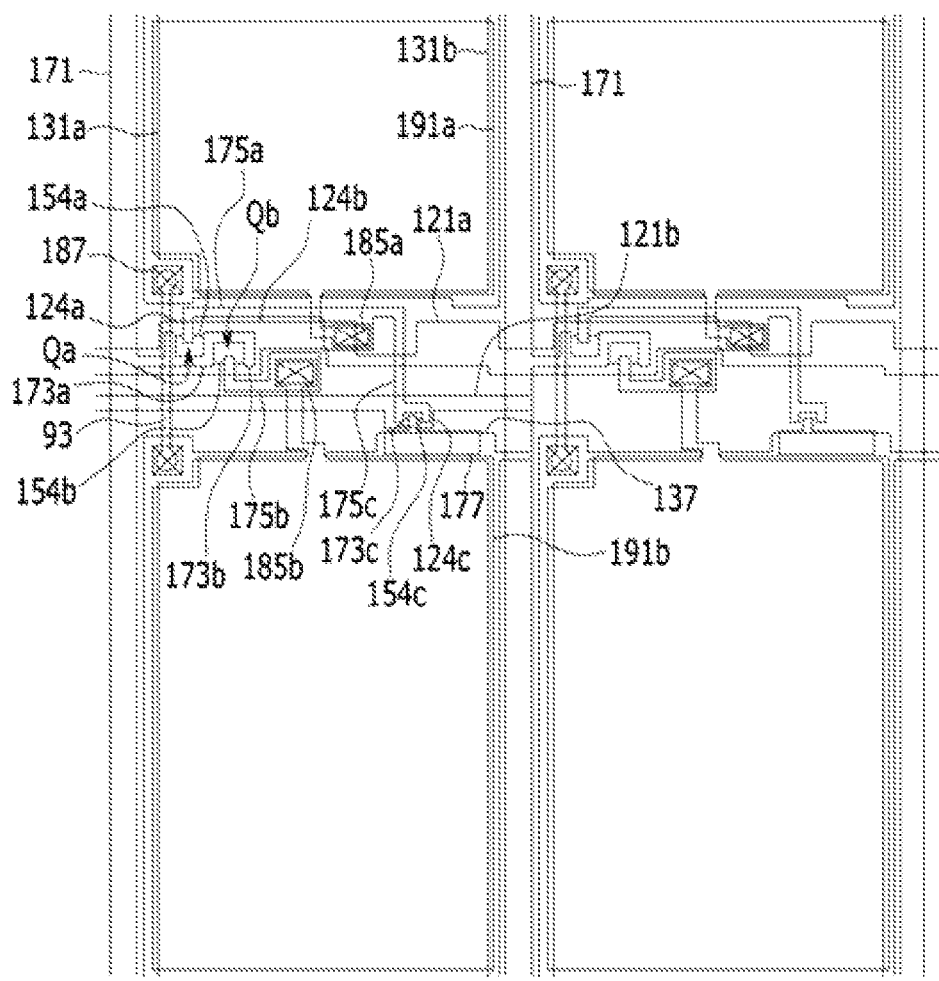
FIG. 13 is a top plan view of another alternative exemplary embodiment of the liquid crystal display according to the invention.

Then, an alternative exemplary embodiment of the liquid crystal display according to the invention will be described with reference to FIG. 13. FIG. 13 is a top plan view of an alternative exemplary embodiment of the liquid crystal display according to another exemplary embodiment of the invention.

Referring to FIG. 13, an exemplary embodiment of the display device includes a first gate line 121a, a second gate line 121b, a first reference voltage line 131a and a second reference voltage line 131b.

The first gate line 121a includes a first gate electrode 124a and a second gate electrode 124b, and the second gate line 121b includes a third gate electrode 124c.

A first semiconductor 154a is disposed on the first gate electrode 124a, a second semiconductor 154b is disposed on the second gate electrode 124b, and a third semiconductor 154c is disposed on the third gate electrode 124c. A first source electrode 173c and a first drain electrode 175a are disposed on the first semiconductor 154a, and a second source electrode 173b and a second drain electrode 175b are disposed on the second semiconductor 154b. The first source electrode 173a and the second source electrode 173b are connected to a data line 171. A third source electrode 173c and a third drain electrode 175c are disposed on the third semiconductor 154c, and the third drain electrode 175c is connected to the second drain electrode 175b. The third source electrode 173c has an extension 177, and the extension 177 of the third source electrode 173c overlaps extensions 137 of the reference voltage lines 131a and 131b to form a boosting capacitor CLP.

The first drain electrode 175a is physically and electrically connected to the first subpixel electrode 191a through a first contact hole 185a which is formed in a passivation layer, and the second drain electrode 175b is physically and electrically connected to the second subpixel electrode 191b through a second contact hole 185b which is formed in the passivation layer. The first subpixel electrode 191a and the second subpixel electrode 191b may have a shape corresponding to the shape of the unit electrode shown in FIG. 4 or 5.

The first reference voltage line 131a and the second reference voltage line 131b are disposed at the left and right sides of the subpixel electrodes 191a and 191b and overlaps the subpixel electrodes 191a and 191b to form a storage capacitor.

The first reference voltage lines 131a, which are separately disposed at the upper and lower sides in a pixel column direction with the two gate lines 121a and 121b therebetween, are connected to each other through a fifth contact hole 187 and a third connecting member 93 which covers the fifth contact hole 187. The separated second reference voltage lines 131b may be connected to each other in such a manner.

In an exemplary embodiment of the liquid crystal display according to the invention, the pixel electrode is divided into the first subpixel electrode and the second subpixel electrode, substantially the same data voltage is applied to the first subpixel electrode and the second subpixel electrode, and the thin film transistor connected to the first subpixel electrode and the reference voltage line is included, such that the voltage of the first subpixel electrode may be controlled to be higher than the data voltage. Accordingly, a grayscale change in a low gray region may be substantially smoothly controlled, and as a result, the grayscale level in the low gray region is substantially effectively expressed, high luminance is thereby obtained, and side visibility is substantially close to the front visibility, thereby substantially improving the visibility.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a first gate line disposed on the first substrate;
   a second gate line disposed on the first substrate;
   a data line disposed on the first substrate;
   a reference voltage line disposed on the first substrate and extending substantially parallel to the data line;
   a first subpixel electrode disposed in a pixel area on the first substrate;
   a second subpixel electrode disposed in the pixel area on the first substrate;
   a first switching element connected to the first gate line, the data line and the first subpixel electrode;
   a second switching element connected to the first gate line, the data line and the second subpixel electrode; and
   a third switching element connected to the first subpixel electrode and the reference voltage line.

2. The liquid crystal display of claim 1, wherein the third switching element is connected to the first gate line.

3. The liquid crystal display of claim 2, wherein a data voltage applied to the data line and a reference voltage applied to the reference voltage line have a same polarity as a common voltage applied to a common electrode.

4. The liquid crystal display of claim 3, wherein the reference voltage has a predetermined magnitude, and a polarity of the reference voltage is changed in each frame.

5. The liquid crystal display of claim 4, wherein a difference in voltage between the first subpixel electrode and the common electrode is greater than a difference in voltage between the second subpixel electrode and the common electrode.

6. The liquid crystal display of claim 5, wherein an input terminal of the third switching element is connected to the reference voltage line, and an output terminal of the third switching element is connected to the first subpixel electrode.

7. The liquid crystal display of claim 6, wherein the reference voltage line comprises a first reference voltage line and a second reference voltage line, to which reference voltages having different polarities are applied, and each of the first reference voltage line and the second reference voltage line overlaps the first subpixel electrode and the second subpixel electrode.

8. The liquid crystal display of claim 2, wherein a reference voltage applied to the reference voltage line has a predetermined magnitude, and a polarity the reference voltage is changed in each frame.

9. The liquid crystal display of claim 8, wherein a difference in voltage between the first subpixel electrode and a common electrode is greater than a difference in voltage between the second subpixel electrode and the common electrode.

10. The liquid crystal display of claim 9, wherein an input terminal of the third switching element is connected to the reference voltage line, and an output terminal of the third switching element is connected to the first subpixel electrode.

11. The liquid crystal display of claim 9, wherein the reference voltage line comprises a first reference voltage line and a second reference voltage line, to which reference voltages having different polarities are applied, and each of the first reference voltage line and the second reference voltage line overlaps the first subpixel electrode and the second subpixel electrode.

12. The liquid crystal display of claim 2, wherein an input terminal of the third switching element is connected to the reference voltage line, and an output terminal of the third switching element is connected to the first subpixel electrode.

13. The liquid crystal display of claim 12, wherein the reference voltage line comprises a first reference voltage line and a second reference voltage line, to which reference voltages having different polarities are applied, and each of the first reference voltage line and the second reference voltage line overlaps the first subpixel electrode and the second subpixel electrode.

14. The liquid crystal display of claim 2, wherein the reference voltage line comprises a first reference voltage line and a second reference voltage line, to which reference voltages having different polarities are applied, and each of the first reference voltage line and the second reference voltage line overlaps the first subpixel electrode and the second subpixel electrode.

15. The liquid crystal display of claim 1, wherein the third switching element is connected to the second gate line.

16. The liquid crystal display of claim 15, further comprising:
    a boosting capacitor connected to the third switching element,
    wherein the reference voltage line is connected to a first terminal of the boosting capacitor.

17. The liquid crystal display of claim 16, wherein
a second terminal of the boosting capacitor is connected to an input terminal of the third switching element, and
an output terminal of the third switching element is connected to the first subpixel electrode.

18. The liquid crystal display of claim 17, wherein
a data voltage applied to the data line and a reference voltage applied to the reference voltage line have a same polarity as a common voltage applied to a common electrode.

19. The liquid crystal display of claim 18, wherein
the reference voltage has a predetermined magnitude, and a polarity of the reference voltage is changed in each frame.

20. The liquid crystal display of claim 19, wherein
a difference in voltage between the first subpixel electrode and the common electrode is greater than a difference in voltage between the second subpixel electrode and the common electrode.

21. The liquid crystal display of claim 20, wherein
the reference voltage line comprises a first reference voltage line and a second reference voltage line, to which reference voltages having different polarities are applied, and
each of the first reference voltage line and the second reference voltage line overlaps the first subpixel electrode and the second subpixel electrode.

22. The liquid crystal display of claim 16, wherein
a data voltage applied to the data line and a reference voltage applied to the reference voltage line have a same polarity as a common voltage applied to a common electrode.

23. The liquid crystal display of claim 22, wherein
the reference voltage has a predetermined magnitude, and a polarity of the reference voltage is changed in each frame.

24. The liquid crystal display of claim 23, wherein
a difference in voltage between the first subpixel electrode and the common electrode is greater than a difference in voltage between the second subpixel electrode and the common electrode.

25. The liquid crystal display of claim 24, wherein
the reference voltage line includes a first reference voltage line and a second reference voltage line to which reference voltages having different polarities are applied, and
each of the first reference voltage line and the second reference voltage line overlaps the first subpixel electrode and the second subpixel electrode.

26. The liquid crystal display of claim 16, wherein
the reference voltage line comprises a first reference voltage line and a second reference voltage line, to which reference voltages having different polarities are applied, and
each of the first reference voltage line and the second reference voltage line overlaps the first subpixel electrode and the second subpixel electrode.

* * * * *